United States Patent

Tajima et al.

[11] Patent Number: 5,832,664
[45] Date of Patent: Nov. 10, 1998

[54] POWER WINDOW DEVICE WITH SAFETY DEVICE

[75] Inventors: Keiichi Tajima; Hitoshi Takeda; Toru Nakayama, all of Shimizu, Japan

[73] Assignee: Koito Manufacturing Co., Ltd., Tokyo, Japan

[21] Appl. No.: 898,004

[22] Filed: Jul. 25, 1997

Related U.S. Application Data

[63] Continuation of Ser. No. 362,168, Dec. 22, 1994, abandoned.

[30] Foreign Application Priority Data

Dec. 22, 1993 [JP] Japan ................................. 5-346386

[51] Int. Cl.$^6$ ..................................................... E05F 15/02
[52] U.S. Cl. ................................................. 49/26; 318/434
[58] Field of Search ................................. 49/26, 27, 28, 49/348, 349, 352; 318/434, 468, 469, 266, 286

[56] References Cited

U.S. PATENT DOCUMENTS

| | | | |
|---|---|---|---|
| 4,763,219 | 8/1988 | Nakamura | 361/23 |
| 5,105,135 | 4/1992 | Nashiki et al. | 318/434 X |
| 5,166,586 | 11/1992 | Yaguchi | 318/434 |
| 5,220,259 | 6/1993 | Werner et al. | 318/434 X |
| 5,385,013 | 1/1995 | Barron et al. | 60/39.02 |
| 5,399,949 | 3/1995 | Hidaka | 318/434 |
| 5,404,673 | 4/1995 | Takada et al. | 49/28 |

*Primary Examiner*—Jerry Redman
*Attorney, Agent, or Firm*—Sughrue, Mion, Zinn, Macpeak & Seas, PLLC

[57] ABSTRACT

A safety control power window device which reliably detects nipping of a finger by a window and sash and which is little influenced by variations of motor characteristics of the motor used as a drive source of the power window device. The window position and a thrust pressure acting on the rotary shaft of the motor providing the force for opening and closing the window are detected. Reference pressures for detecting nipping are set according to the window position detected. By comparing the detected pressure and the reference pressures, nipping by the window is detected. Since nipping and the window position are not detected using the drive current of the motor, accurate safety control is realized, eliminating influences caused by variations of the characteristics of the motor.

12 Claims, 8 Drawing Sheets

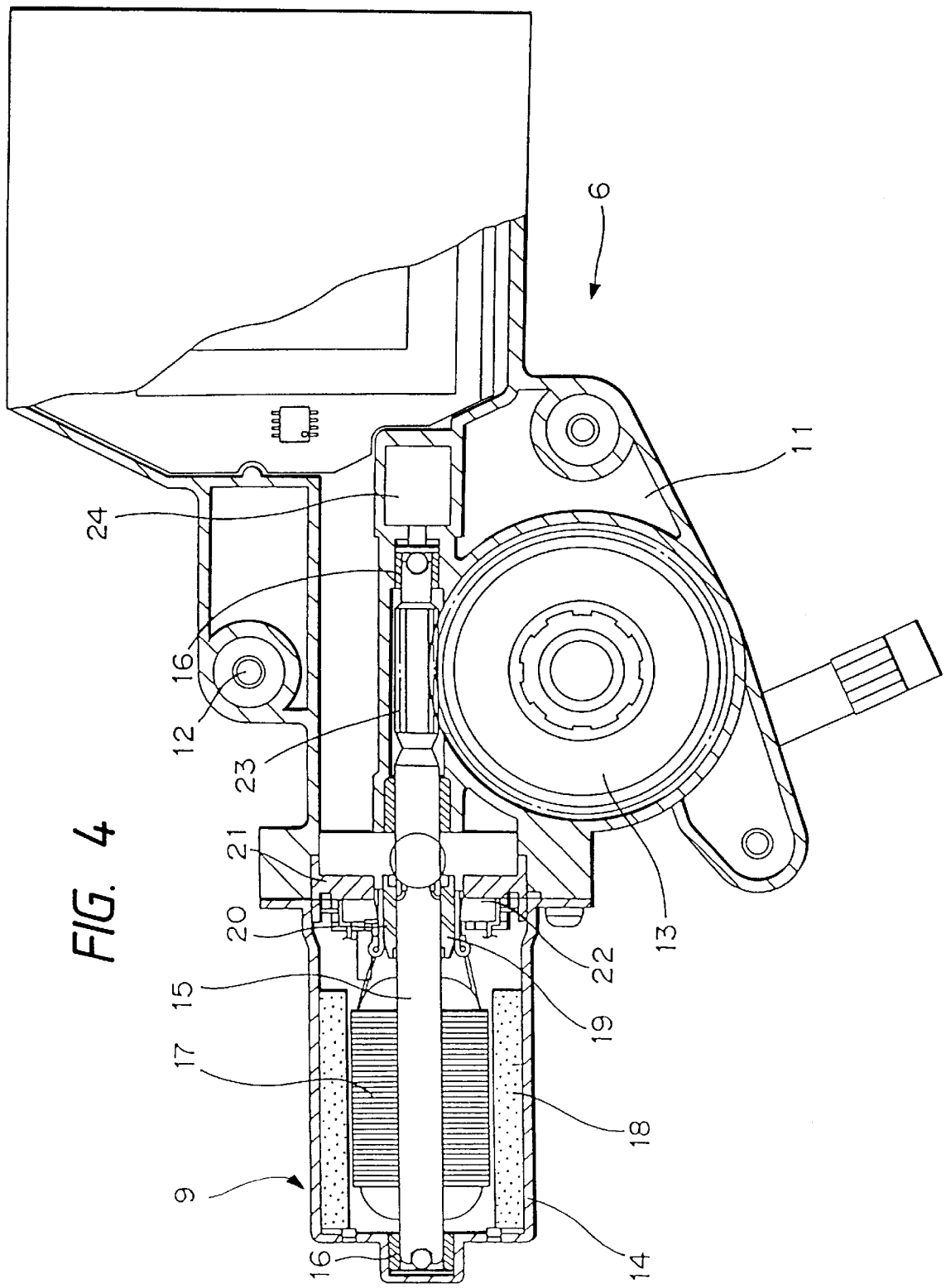

POWER WINDOW DEVICE WITH SAFETY DEVICE

This is a Continuation of application Ser. No. 08/362,168 filed Dec. 22, 1994, now abandoned.

BACKGROUND OF THE INVENTION

The present invention relates to a power window device for opening and closing a window, especially a window of a motor vehicle. More particularly, the invention relates to a power window device with a safety device for protecting the driver and passengers from nipping of fingers, hand or head by the window.

In a conventional power window device, the window is opened and closed using the force of a drive source such as an electric motor. However, the fingers, hand or head of a person can possibly be nipped between the window and the sash, resulting in a dangerous situation. To avoid such a problem, there has been proposed a power window device with a safety device wherein when nipping occurs, the power window device senses such a state and stops the closing motion of the window or opens the window.

In one previously proposed power window device, the power window device detects the nipping state from the motor speed, which correlates with the opening/closing speed of the window. When the motor speed decreases below a preset reference value, that is, when the load on the window is increased by nipping and the motor speed correspondingly decreases, the power window device judges that nipping has occurred.

However, the nipping detecting method employed by such a power window device requires a detecting device for electromagnetically or optically sensing the motor speed. Because of this, the overall power window device is complicated in structure and high in cost. Moreover, due to the inevitable vibration and shock present in a motor vehicle, the sensing accuracy provided by the motor-speed sensing device is frequently insufficient.

To avoid this problem, there has been proposed another nipping detecting method in which the load on the window or the load on the motor to which the load of the window is applied is sensed. To do this, the torque of the motor is sensed. To measure the motor torque though, a complicated device is required. It is impractical to incorporate such a complicated device into a power window device.

These circumstance led to another proposal whereby the motor drive current is sensed, the motor drive current is compared with a reference value, and finally the nipping is detected on the basis of the comparison result.

However, there are unavoidably slight variations in the characteristics of actual motors. Because of this, the drive currents of the motors also vary. For this reason, when motors are assembled into the power window devices, the current-torque characteristics of the motors must be measured for every motor, and the reference value manually adjusted for each motor. This makes the assembly work of the power window device complicated.

SUMMARY OF THE INVENTION

An object of the present invention is to provide a power window device with a safety device which reliably detects nipping by the window and related member, e.g., the sash, but which is not influenced by variations of motor characteristics, thereby enabling better safety control.

To achieve the above and other objects, there is provided a power window device with a safety device which senses nipping in a window driven for opening and closing by a motor, thereby providing safety control, the power window device comprising thrust load sensing means for sensing a thrust load on the rotary shaft of the motor, and nipping detecting means for detecting nipping by comparing the sensed thrust load with a reference value.

The power window device may further comprise means for mechanically and electrically sensing the open/closed position of the window, and means for setting a nipping detection reference value on the basis of the sensed open/closed position of the window.

The power window device thus constructed detects an increase of the thrust load caused when nipping by the window and its related member occurs, and compares the load with a reference value. When the former is larger than the latter, the power window device judges that nipping has occurred, and then executes a safety control procedure. Accordingly, the power window device can stably detect nipping irrespective of any variation of the current-torque characteristics of the motor.

BRIEF DESCRIPTION OF THE DRAWINGS

FIG. 4 is a cross-sectional view showing a window drive section;

DESCRIPTION OF THE PREFERRED EMBODIMENTS

The present invention now will be described in more detail with reference to the accompanying drawings.

Figure 1:
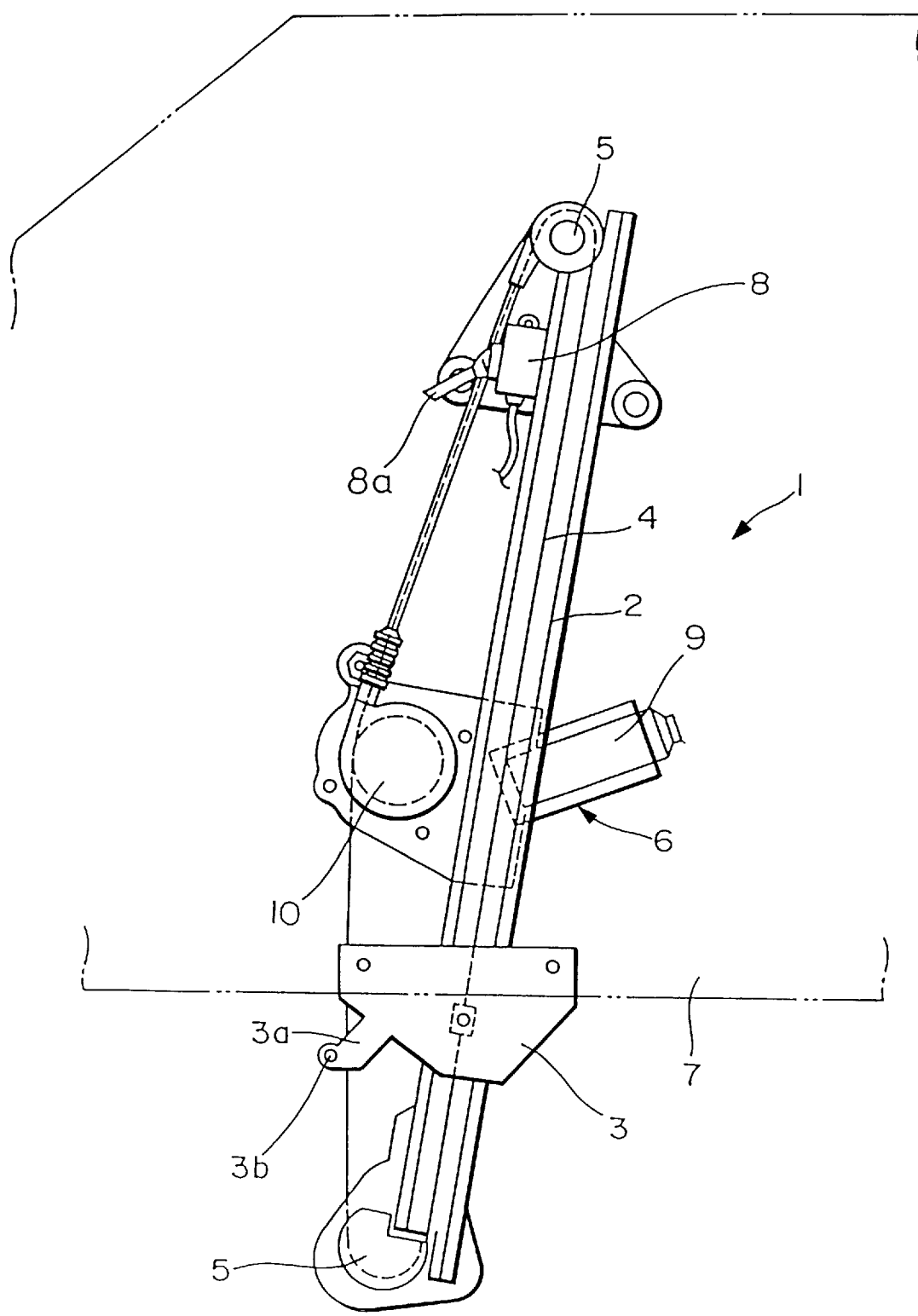
FIG. 1 is a side view showing the overall construction of a power window device according to the present invention.

FIG. 1 is a side view showing the overall construction of a power window device according to the present invention. A window opening/closing mechanism 1 is provided in the car body under a window. The window opening/closing mechanism 1 is provided with a rail 2 along which a slider 3 is slidable. A wire 4, coupled with the slider 3, is wound around pulleys 5 provided at the top and the bottom of the rail 2, and a drive pulley 10 located at a mid portion of the rail. The window drive section 6 includes a motor 9, as will be described later.

When the motor 9 is driven, the wire 4 is turned by the drive pulley 10 so that the slider 3 moves vertically. A window glass 7 is attached to the slider 3. When it is vertically moved together with the slider 3, the window glass 7 opens and closes a window space defined by a sash.

Figure 2:
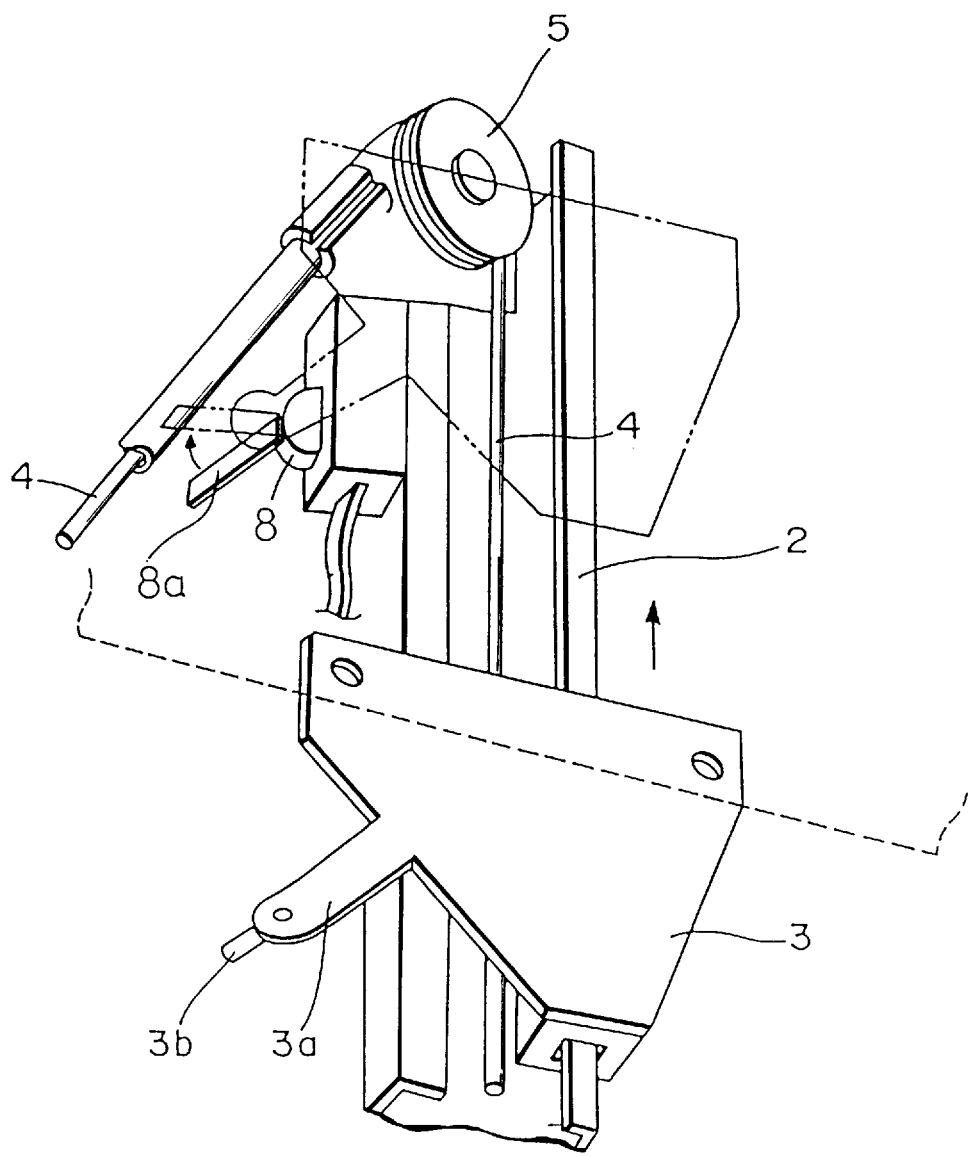
FIG. 2 is an enlarged perspective view showing a key portion of the construction of FIG. 1, useful in explaining the operation of a position sensor.

A position sensor 8, fastened to the upper portion of the rail 2, senses the position of the moving slider 3. The position sensor 8 is a potentiometer in this embodiment. As is well known, the potentiometer is made of a linear resistive member and a movable contact slidable along the linear resistive member. The potentiometer exhibits a resistance value that depends on the position of the movable contact. The movable contact is moved along the resistive member by a sensing lever 8a (FIG. 2). The top end of the sensing lever 8a protrudes outside a case. The position sensor 8 is fastened to the upper portion of the rail 2. The top end of the sensing lever 8a lies in the path of movement of the slider 3.

With this structure, when the window is moved along the rail 2 and reaches a position near the completely closed position, a contact pin 3b fixed to a protruding part 3a of the slider 3 comes into contact with the top end of the sensing lever 8a and pushes the top end thereof to turn the sensing lever 8a in the direction of an arrow. With the turning of the sensing lever 8a, the movable contact of the potentiometer also moves along the linear resistive member to vary the resistance value of the potentiometer.

Figure 3A:
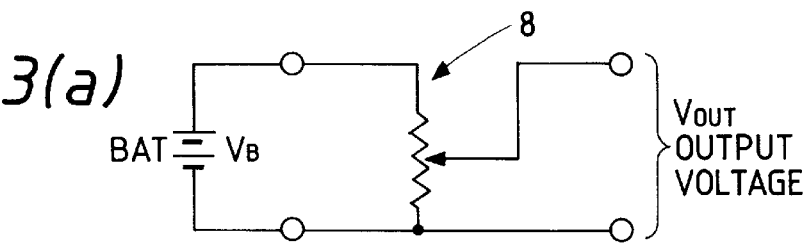
FIG. 3(a) is a schematic diagram of a position sensor.

An electrical circuit including the position sensor 8 is constructed as shown in FIG. 3(a). The position sensor 8 divides a voltage $V_B$ of a battery BAT and outputs a divided voltage as an output voltage $V_{OUT}$. The battery voltage $V_B$ is divided depending on the position of the movable contact of the position sensor 8. Accordingly, the output voltage $V_{OUT}$ of the position sensor 8 represents the window position.

Figure 3B:
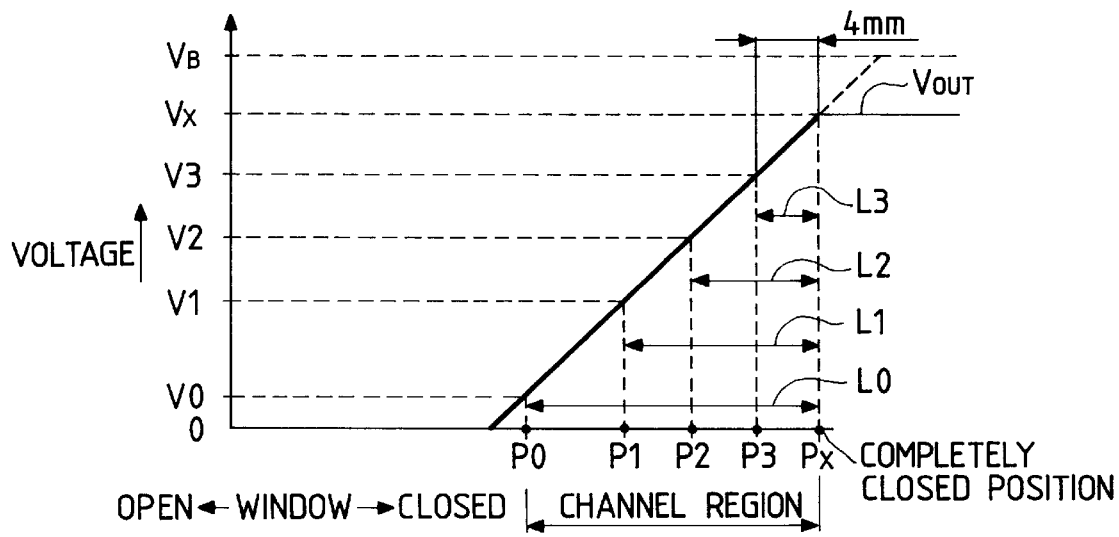
FIGS. 3(b) and 3(c) are graphs showing the relationship between the output voltage of the position sensor and positions of a window when the window is moved for opening or closing.

In this embodiment, the output voltage $V_{OUT}$ increases as the window moves in the closing direction (FIG. 3(b)). The maximum value of the output voltage $V_{OUT}$ is equal to the battery voltage $V_B$, and the minimum value thereof is 0 (zero). When the slider 3 is not in contact with the sensing lever 8a of the position sensor 8, i.e., when the slider 3 is located in the lower portion of the rail 2 or the window is excessively opened, the output voltage $V_{OUT}$ of the position sensor 8 is at the minimum level. When the window moves near the completely closed position or near to a position where the position sensor 8 is triggered, the output voltage $V_{OUT}$ of the position sensor 8 gradually increases.

The window drive section 6, as shown in the cross-sectional view of FIG. 4, includes a body case 11 made of synthetic resin. A plural number of screws 12 are provided to attach the body case 11 to the vehicle door. A worm wheel 13 is provided within the body case 11. The motor 9 is mounted in an opening of the side wall of the body case 11. Within a motor case 14, a rotary shaft 15 extends along the longitudinal axis of the motor case 14 in a state such that the rotary shaft 15 is supported at both ends by bearings 16.

A rotor 17 including an iron core and a coil is mounted on the rotary shaft 15. A stator 18 is mounted on the inner surface of the motor case 14, disposed around the rotor 17. A commutator 20 is provided on a cylindrical collar 19 made of insulating material mounted on the rotary shaft 15. A conductive brush 22 is brought into contact with the commutator 20. The conductive brush 22 is provided on a lock ring 21 supported between the body case 11 and the motor case 14.

A worm gear 23 is attached to the second end of the rotary shaft 15. The worm gear 23 is in mesh with the worm wheel 13. The worm wheel 13 is provided with a pulley (not shown) around which the wire 4 is moved to open and close the window.

A pressure sensor 24 is attached to the end face of the rotary shaft 15 close to the body case 11 in a state such that it may be pressed in the axial direction. The pressure sensor 24 senses a thrust load (thrust pressure) on the rotary shaft 15 and outputs an electrical signal representative of the thrust load.

When the rotary shaft 15 is turned by the motor 9, the worm gear 23 is turned, thereby turning the worm wheel 13 and the pulley and thus moving the wire 4, and in turn moving the window for opening or closing. When an object is nipped by the window and the load on the window varies, the load is transmitted as a force to turn the worm wheel 13 in the reverse direction. Accordingly, the force caused in the worm wheel 13 is transmitted to the rotary shaft 15 since the worm wheel 13 is meshed with the worm gear 23 coupled with the rotary shaft 15. In this case, the force acts so as to move the worm gear 23 in the thrust direction. The pressure sensor or thrust load sensor 24 senses this thrust load of the rotary shaft 15, thereby detecting the load on the window.

Figure 5:
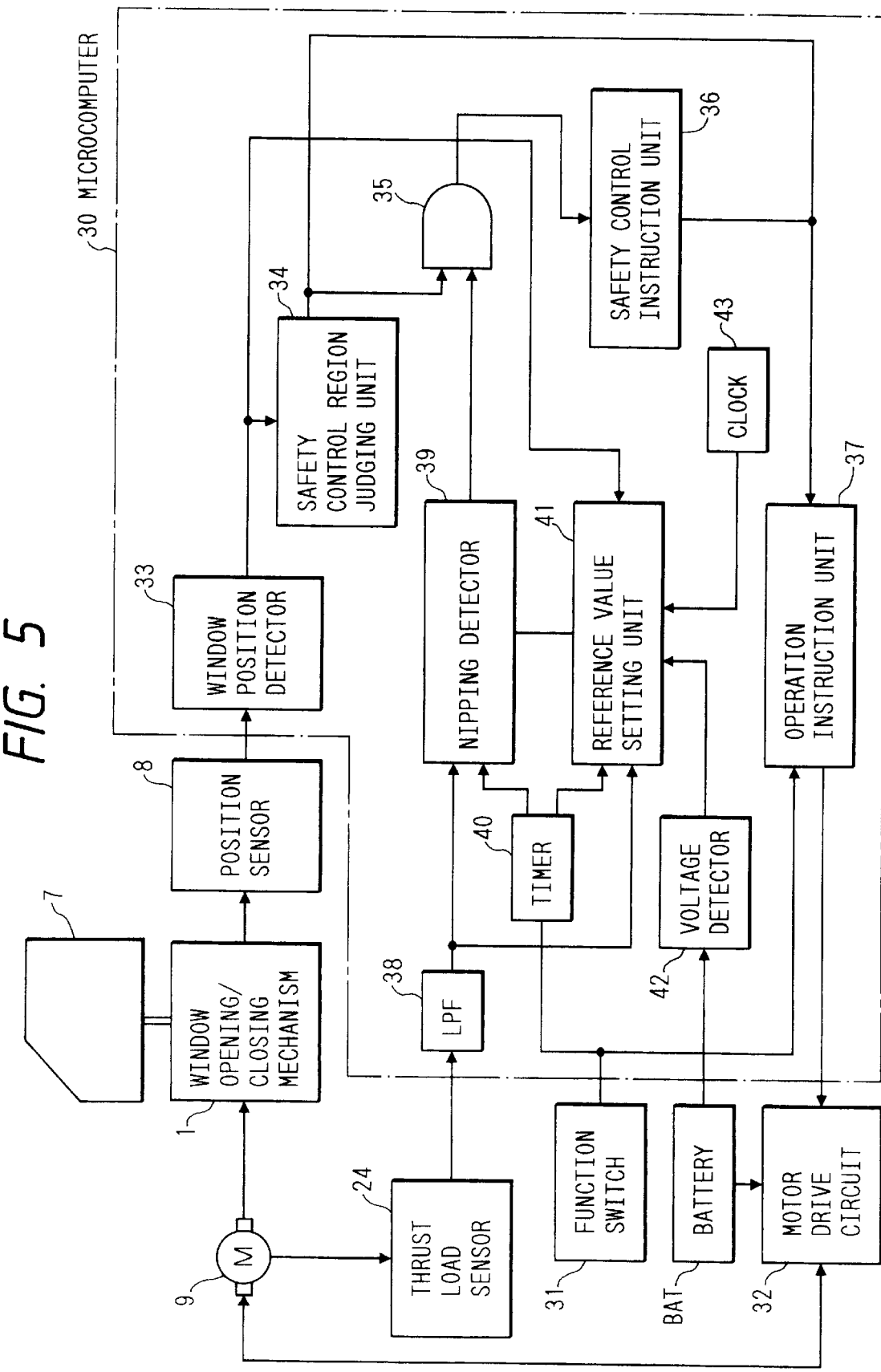
FIG. 5 is a block diagram showing an embodiment of a safety control operation circuit according to the present invention.

FIG. 5 is a block diagram showing the arrangement of a safety control operation circuit of a preferred embodiment of the invention, including the window opening/closing mechanism 1, the position sensor 8, and the pressure sensor 24. A microcomputer 30 receives an output signal, e.g., a voltage signal, from the thrust load sensor 24 for sensing the thrust load on the rotary shaft 15 of the motor 9 as a drive source for the window. The microcomputer 30 further receives an output signal or a window position detection signal from the position sensor 8.

A signal representative of the opened or closed state of the window is selected by manually operating a function switch 31. This select signal is also applied to the microcomputer 30. The function switch 31 is manually operated by the driver or a passenger to open or close the window. In response to signals from the microcomputer 30, the motor drive circuit 32 controls the rotation of the motor 9 in the window drive section 6. The voltage of the battery BAT for supplying electric power to the motor drive circuit 32 is also applied to the microcomputer 30.

The microcomputer 30 includes a system for detecting a safety control region from the open/closed state of the window and another system for detecting the nipping of something by the window and the sash.

In the system for detecting a safety control region, a position detection signal from the position sensor 8 is input to a window position detector 33, which in turn produces a signal representative of the open or closed position of the window. The window position detector 33 detects the present position of the window using the output voltage $V_{OUT}$ output from the position sensor 8.

Figure 6:
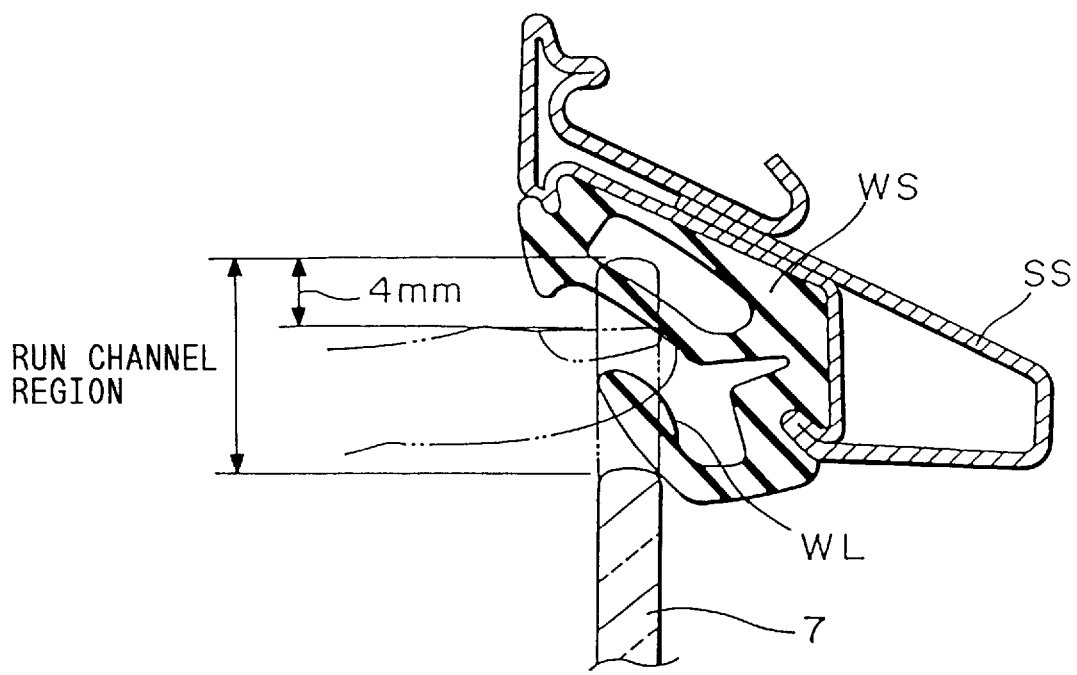
FIG. 6 is a cross-sectional view showing a run channel region in the window.

In this case, positions of the window near the completely closed position are detected in a precise manner by the position sensor 8. In a window of the type in which a weather strip WS is fitted to a sash SS as shown in FIG. 6, the top edge of the window glass 7 starts to contact the lip WL of the weather strip WS at a position approximately 15 mm short of the completely closed position. In this region where the window glass is in contact with the weather strip (this region will be referred to as a run channel region), the movement of the window is impeded, so that the load on the window is increased. This load varies depending on the contact state of the window and the weather strip. In a region of 4 mm from the completely closed position in the direction of opening the window, the gap between window and sash is sufficiently small that even a fingertip of the driver or a passenger cannot be nipped.

The window positions for the position sensor 8 are selected as follows: a position P3 4 mm from the completely closed position Px, and three different positions P2, P1, and P0 at which the window is further opened (FIG. 3 (b)). The lengths between the positions P3 to P0 and the completely closed position Px are denoted as L3, L2, L1, and L0 (L3<L2<L1<L0).

The output voltages V3, V2, V1, and V0 of the position sensor 8 at the window positions P3, P2, P1, and P0 are stored in an internal memory (not shown). The window position detector 33 constantly detects the output voltage $V_{OUT}$ from the position sensor 8, and compares it with the voltages V3 to V0 to detect the window position each between those positions. The output voltage Vx at the completely closed position is set at a voltage slightly lower than the maximum output voltage of the position sensor 8, i.e., the battery voltage $V_B$.

The output signal of the window position detector 33 is applied to a safety control region judging unit 34 and a reference value setting unit 41, which are respectively provided for judging a safety control region and setting a reference value for the nipping detection reference.

By using the output signal from the window position detector 33, the safety control region judging unit 34 judges that all of the positions contained in a region extending in the opening direction of the window from the position P3, which is a small distance (4 mm) from the completely closed position in the opening direction, are within a safety control region. The reason for this is that since the distance of 4 mm is too small to accommodate the fingertip of a person, when the window is positioned within this distance, nipping of a fingertip, etc., cannot occur, and hence there is no need to apply a safety control operation for distances of 4 mm or smaller.

A signal representative of the judgement result output from the safety control region judging unit 34 is applied to one of the input terminals of an AND gate 35, and thence to a safety control instruction unit 36. The judgement result signal is also applied to an operation instruction unit 37. The operation instruction unit 37 receives from the function switch 31 an operation instruction based on the state of the switch, and outputs an appropriate instruction signal to the motor drive circuit 32.

Upon receiving a nipping detection signal, the safety control instruction unit 36 drives the operation instruction unit 37 to perform a safety control operation. In this embodiment, the window is moved a distance of 12 cm in the opening direction from its present position.

In the system for detecting nipping by the window and its related member, a current signal output from the thrust load sensor 24 is applied to a low-pass filter 38. The output signal is applied to a nipping detector 39. The nipping detector 39 compares the received output signal with a reference value set by a reference value setting unit 41 and detects a nipping condition on the basis of the comparison result. The nipping detector 39 is coupled for reception with a timer 40. The timer 40 detects the amount of time elapsing from the time the function switch 31 is turned on for closing the window.

The nipping detector 39 receives a current signal indicative of a pressure value from the thrust load sensor 24 and compares it with a reference pressure Fth set by the reference value setting unit 41. When the average value of the pressure signal is larger than the reference pressure, the nipping detector 39 determines that nipping has occurred. The output signal of the nipping detector 39 is input to a second input terminal of the AND gate 35.

The reference value setting unit 41, coupled for transmission with the nipping detector 39, receives the output signal of the timer 40 and a pressure value signal from the thrust load sensor 24, and additionally a detection value signal from the voltage detector 42 for detecting the battery voltage of the battery BAT. The reference value setting unit 41 receives a timing signal (as a reference signal) from a clock 43. After the timer 40 determines a time S1 has elapsed, the reference value setting unit 41 samples the pressure value signal from the thrust load sensor 24 a preset number of times N, and calculates an average value of the N pressure values sampled. The resultant average value is set as an average pressure F0.

The reference value setting unit 41 contains a memory. A lock pressure FL of the motor 9 and a special reference pressure Fx in the vicinity of the completely closed position of the window are stored in the memory. When the battery voltage $V_B$ is detected by the voltage detector 42, the battery voltage $V_B$ and the average pressure F0 obtained by the above calculation are used to address the memory to find the corresponding values of the lock pressure FL and the special reference pressure Fx. The term "lock pressure" means a current value caused when the window is completely closed and the load on the window is increased.

The lock pressure FL is used at the start of the motor and when the window is present in the vicinity of the completely closed position, or in the region between the window position P3 and the completely closed position Px. The special reference pressure Fx in the vicinity of the completely closed position of the window is used in the region of the window positions P3 to P0. The special reference pressure Fx is stepwise incremented with respect to the segmental distances P0 and P1, P1 and P2, and P2 and P3.

Figure 7:
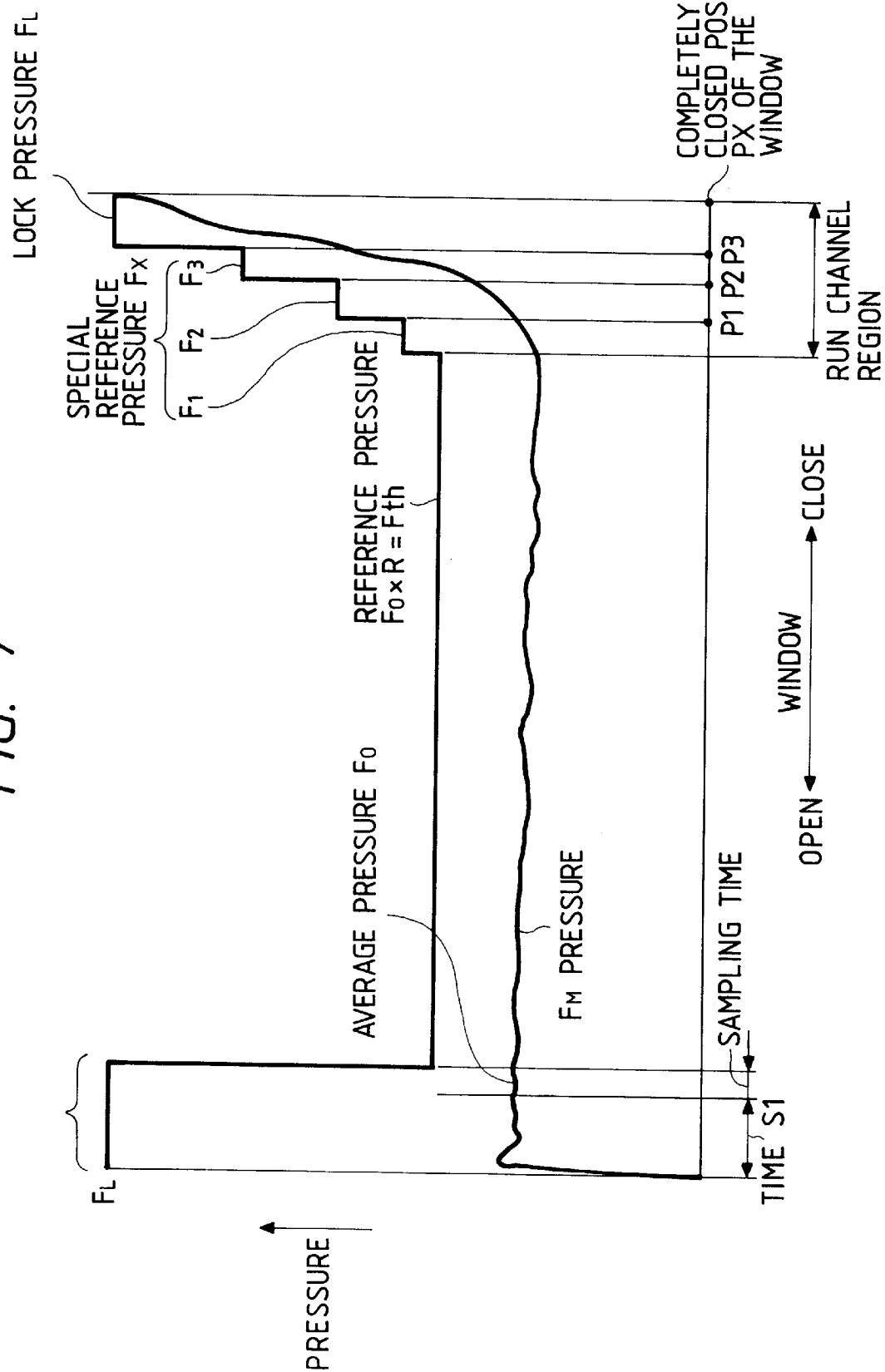
FIG. 7 is a characteristic diagram showing a thrust load, useful in explaining the operation of the present invention.
Figure 8:
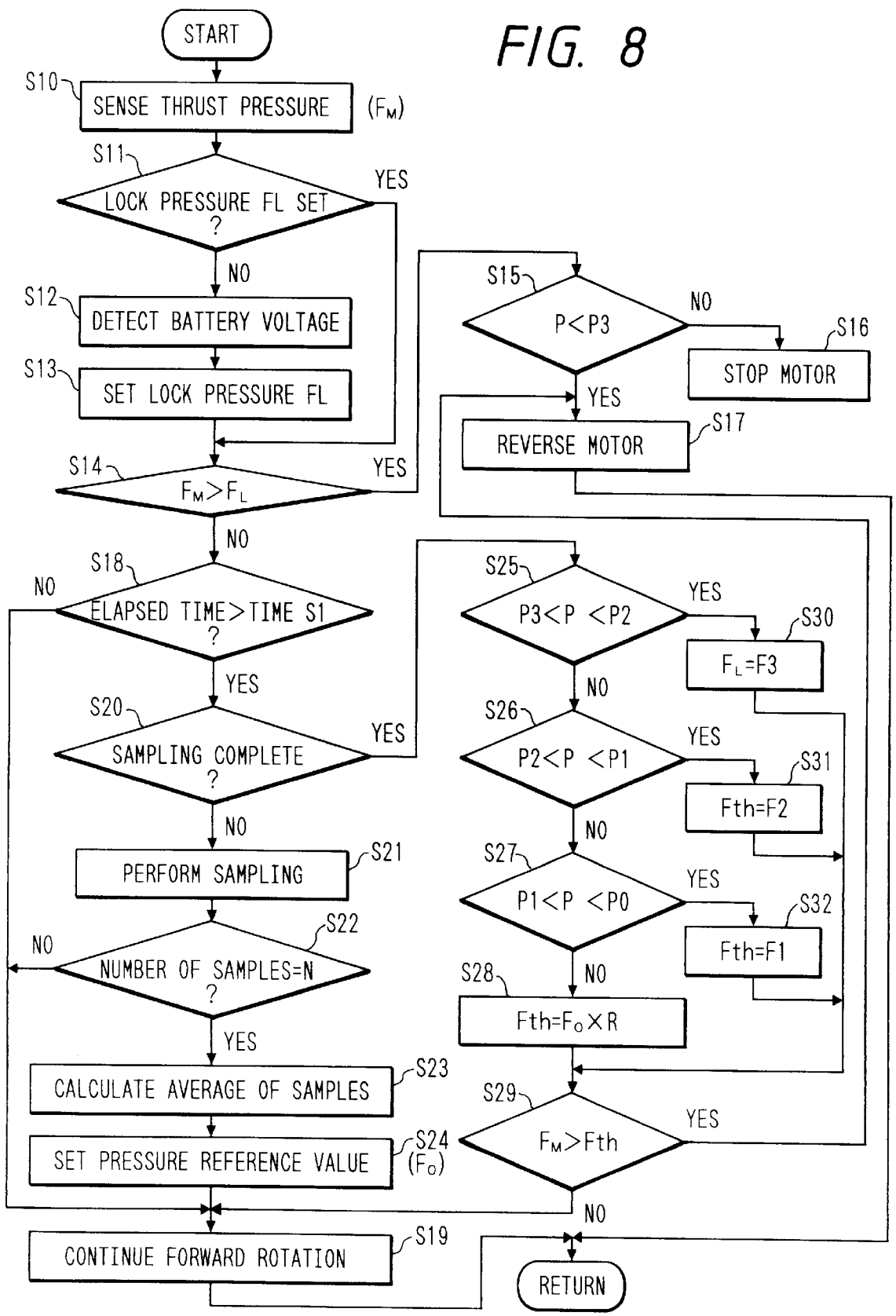
FIG. 8 is a flowchart showing the operation of the present invention.

The operation of the power window device thus constructed will be described with reference to FIGS. 7 and 8 showing a timing chart and a flowchart. To start, a window closing switch of the function switch 31 is turned on to drive the motor 9. The thrust load sensor 24 starts to sense the pressure FM by the thrust load on the rotary shaft 15 (step S10). As the motor 9 turns, the window opening/closing mechanism 1 moves the window in the closing direction.

The nipping detector 39 determines whether or not the lock pressure FL is set (step S11). If not set, the voltage detector 42 detects a battery voltage $V_B$ (step S12). The reference value setting unit 41 sets a lock pressure FL according to the detected voltage. The lock pressure FL and the thrust pressure FM are compared (step S14).

The window position detector 33 detects the window position P using an output voltage $V_{OUT}$ derived from the position sensor 8. In a state where the window is sufficiently opened, the sensing lever 8a of the position sensor 8 is not operated by the slider 3. Accordingly, in this state, the output voltage of the position sensor 8 is the minimum value 0 (zero). This value indicates a region not requiring safety control of the window.

In a state where the window has moved to a region near the completely closed position, the slider 3 is operated by the sensing lever 8a of the position sensor 8. Accordingly, the resistance of the slider is varied. The position sensor 8 produces an output voltage $V_{OUT}$ (FIG. 3(b)) representing the amount of movement of the slider. The window position detector 33 detects the current position of the window using the output voltage.

Figure 3C:
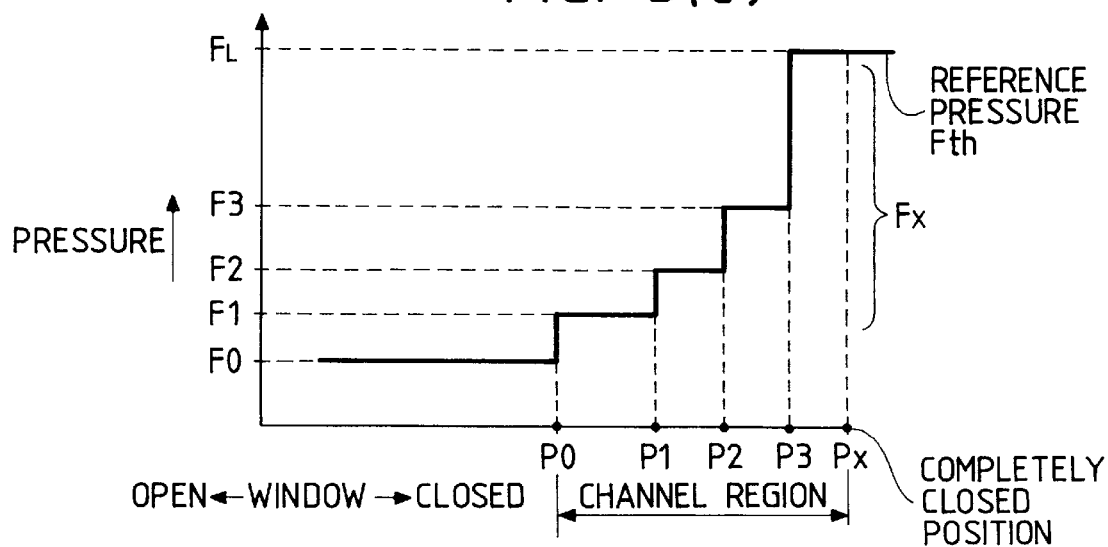

Referring to FIG. 3(c), it is seen that the window position P is successively detected in the direction of opening the window. Through the comparison of the output voltage $V_{OUT}$ of the position sensor 8 with the voltages V0 to V3 stored in the memory, the window position detector 33 successively checks whether or not the window position P is closer to the completely closed position Px than the window position P3 window position P<P3), the window position P is between the positions P3 and P2 (P3<P<P2), the window position P is between the positions P2 and P1 (P2<P<P1), or the window position P is between the positions P1 and P0 (P1<P<P0).

When the thrust pressure FM is larger than the lock pressure FL, the window position P is compared with the window position P3 (step S15). If P<P3, the window is spaced a distance of 4 mm or less from the completely closed position. In this state, no nipping can occur. The safety control region judging unit 34 produces no signal for transmission to the safety control instruction unit 36, so that no safety control operation is performed. Accordingly, it can be considered that the window is at the completely closed position. The operation instruction unit 37 applies a signal to the motor drive circuit 32, thereby to stop the rotation of the motor 9 (step S16). Thus there is eliminated such a situation when the window is at the completely closed position, safety control is performed, preventing the window from being completely closed.

When the window position P exceeds the position P3, the window is in the safety control region. At this time, if the thrust load current is larger than the lock current value, it is judged that nipping has occurred. The safety control instruction unit 36 applies a signal to the operation instruction unit 37 to turn the motor 9 in the reverse direction (window opening direction) and to stop the motor 9 after the window is opened a distance of 12 cm . Accordingly, the hand or the finger nipped by the window and the sash can be released.

When the pressure FM is smaller than the lock pressure FL, the time S1 is counted by the timer 40 to remove an initial variation of the thrust load caused in the rotary shaft of the motor (step S18). Until the time counted by the timer 40 terminates, the motor 9 continues its forward rotation (step S19). After the time S1 elapses, the reference value setting unit 41 starts to sample the pressure FM to obtain a number N of pressure values (steps S20 to S22). The reference value setting unit 41 calculates an average of the N pressure values (step S23), and sets the average value as an average pressure F0 therein (step S24).

When the sampling operation terminates, the window position P is successively compared with the positions P3, P2, P1, and P0, as described above (steps S25 to S27). As the result of the comparison, if P>P0, that is, the window is in an open state outside the run channel region of the weather strip WS, the value of the product of the average pressure F0 set in the step S24 and a coefficient R (F0×R) (R=1.05, for example) is set as a reference pressure Fth (step S28). Subsequently, the nipping detector 39 compares the pressure FM with this reference pressure Fth, thereby detecting nipping (step S29). Accordingly, when the safety control region judging unit 4 and the nipping detector 39 produce both signals, the safety control instruction unit 36 produces a signal for transmission to the operation instruction unit 37. The motor 9 is then driven to perform a safety control operation as mentioned above (step S17).

When the window is in the segmental regions between the positions P3 and P2, P2 and P1, and P1 and P0, the special reference pressures F3, F2, and F1 are set as reference pressures Fth according to the special reference voltage Fx preset in the memory (FIG. 3(c)).

In the region of the positions P3 to P0, the nipping detector 39 detects nipping by comparing the pressure FM with the special reference pressures F3, F2, and F1 (step S32). The safety control operation in this case is also the same as described above. Accordingly, in the region of P3 to P0, the window advances to the run channel region of the weather strip WS. The load on the window gradually increases. With this load increase, the special reference pressures F1 to F3 are stepwise incremented. Through this operation, nipping detection is carried out. Even in a situation where the window when moving in the closing direction reaches the run channel region and contacts the weather strip WS, whereby the load is increased and the current value is increased, the reference current value is successively increased correspondingly. Therefore, the nipping can be properly detected in the region of L3 to L0.

A load cell may be used for the thrust load sensor. In this case, the load cell is attached to the rotary shaft to sense a thrust load of the rotary shaft.

Figure 9:
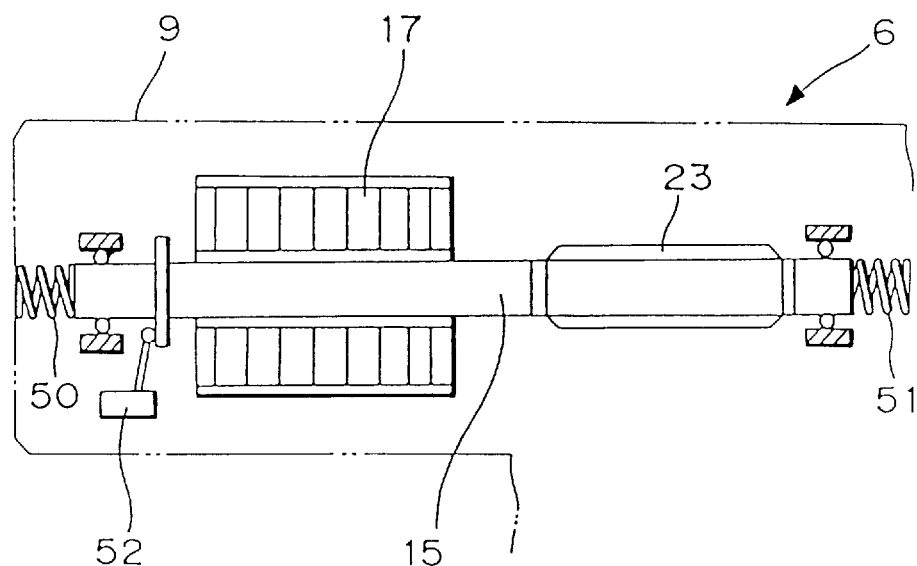
FIG. 9 is a diagram showing another example of a thrust load sensor.

An alternative is shown in FIG. 9. Both ends of the rotary shaft 15 are supported by compressed coiled springs 50 and 51. A stroke sensor 52, such as a potentiometer, is provided for sensing the amount of movement of the rotary shaft 15. To detect a thrust load acting on the rotary shaft 15, the amount of movement of the rotary shaft 15 caused by the thrust load is sensed by the stroke sensor 52.

The thrust load current characteristic of the rotary shaft with respect to the opening/closing operation is illustrated by way of example. Different window structures have different thrust load current characteristics of the rotary shaft. In this case, the reference current value is controlled according to the window structure.

In the above embodiments, the run channel region is segmented into three segmental regions. The reference current values for these segmental regions are stepwise set. However, to improve the accuracy of the nipping detection, the number of segmental regions can increased.

As described above, in accordance with the present invention, nipping is detected by comparing the thrust load acting on the rotary shaft of the motor for opening/closing the window with a reference value. Accordingly, nipping by the window and its related members can be detected irrespective of motor characteristic variations. Also, there is eliminated the work required to alter and adjust the reference value if the motor characteristics of the motors are not uniform. A high accuracy of nipping detection is realized, and manufacture and assembly of the power window device are easy.

The window position is mechanically and electrically detected, and the reference value for nipping detection is set based on the detected window position. With this feature, there is eliminated the possibility of effecting an erroneous safety control operation caused by a variation of the thrust load when the window is opened or closed. Reliable and stable safety control is therefore realized.

What is claimed is:

1. A safety control power window device in combination with a window glass, said safety control power window device having a motor for supplying a force for raising and lowering the window glass, said motor comprising a rotary shaft that receives a thrust load when an object is nipped by the window glass, said safety control power window device comprising:

means for sensing the thrust load on said rotary shaft of said motor; and nipping detecting means for detecting nipping by comparing the thrust load sensed by said means for sensing with a reference value, wherein said thrust load sensing means comprises a pressure sensor sensing a thrust pressure on said rotary shaft of said motor.

2. The safety control power window device of claim 1, wherein said pressure sensor comprises a load cell.

3. The safety control power window device of claim 1, further comprises a pair of compressed coil springs supporting respective ends of said rotary shaft, and wherein said pressure sensor comprises a stroke sensor for sensing an amount of movement of said rotary shaft in a longitudinal direction thereof.

4. The safety control power window device of claim 3, wherein said stroke sensor comprises a potentiometer.

5. The safety control power window device of claim 1, wherein said nipping detecting means detects nipping only within a safety control region.

6. A safety control power window device in combination with a window glass, said safety control power window device having a motor for supplying a force for raising and lowering the window glass, said motor comprising a rotary shaft that receives a thrust load when an object is nipped by the window glass, said safety control power window device comprising:

thrust load sensing means for sensing the thrust load on said rotary shaft of said motor;

means for detecting nipping by comparing the thrust load sensed by said thrust load sensing means with a reference value;

means for sensing an opening/closing position of said window; and means for setting said reference value in response to the opening/closing position of said window sensed by said means for sensing, wherein said opening/closing position sensing means comprises a potentiometer.

7. A safety control power window device in combination with a window glass, said safety control power window device having a motor for supplying a force for raising and lowering the window glass, said motor comprising a rotary shaft that receives a thrust load when an object is nipped by the window glass, said safety control power window device comprising:

thrust load sensing means for sensing the thrust load on said rotary shaft of said motor;

means for detecting nipping by comparing the thrust load sensed by said thrust load sensing means with a reference value;

means for sensing an opening/closing position of said window; and means for setting said reference value in response to the opening/closing position of said window sensed by said means for sensing, wherein said means for setting said reference value increases said reference value in stages at a plurality of positions from a completely closed position of said window.

8. The safety control power window device of claim 7, wherein said reference value setting means comprises means for extracting values from a memory stored at locations in said memory corresponding to distances of said window from a completely closed position of said window.

9. The safety control power window device of claim 7, wherein said thrust load sensing means comprises means for sampling said thrust load pressure a number of times to collect a plurality of samples, and means for averaging the samples.

10. A safety control power device in combination with a window glass, said safety control power window device having a motor for supplying a force for raising and lowering the window glass, said motor comprising a rotary shaft that receives a thrust load when an object is nipped by the window glass, said safety control power window device comprising:

a load cell attached to the rotary shaft to sense the thrust load on the rotary shaft; and nipping detecting means for detecting nipping by comparing the thrust load sensed by said load cell with a reference value.

11. A safety control power window device in combination with a window glass, said safety control power window device having a motor for supplying a force for raising and lowering the window glass, said motor comprising a rotary shaft that receives a thrust load when an object is nipped by the window glass, said safety control power window device comprising:

a stroke sensor sensing an amount of movement of the rotary shaft of the motor in a direction parallel to a longitudinal axis of the rotary shaft; and nipping detecting means for detecting nipping by comparing the amount of movement of the rotary shaft sensed by said stroke sensor with a reference value, wherein said stroke sensor comprises a potentiometer.

12. A safety control power window device as recited in claim 11, further comprising compressed coil springs supporting opposite axial ends of the rotary shaft.

* * * * *